(12) United States Patent
Wei et al.

(10) Patent No.: US 12,124,455 B2
(45) Date of Patent: *Oct. 22, 2024

(54) METHODS FOR UPDATING REFERENCE COUNT AND SHARED OBJECTS IN A CONCURRENT SYSTEM

(71) Applicant: OPEN TEXT CORPORATION, Waterloo (CA)

(72) Inventors: Shu-Shang Sam Wei, Danville, CA (US); Shuaib Hasan Khwaja, Pleasanton, CA (US); Pankaj Pradhan, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,833

(22) Filed: Jun. 8, 2023

(65) Prior Publication Data

US 2023/0350898 A1 Nov. 2, 2023

Related U.S. Application Data

(63) Continuation of application No. 17/667,167, filed on Feb. 8, 2022, now Pat. No. 11,709,841, which is a continuation of application No. 15/431,225, filed on Feb. 13, 2017, now Pat. No. 11,263,214, which is a
(Continued)

(51) Int. Cl.
*G06F 15/16* (2006.01)
*G06F 9/38* (2018.01)
*G06F 12/02* (2006.01)
*G06F 16/22* (2019.01)
*G06F 16/2455* (2019.01)
*G06F 16/28* (2019.01)
*H04L 67/1097* (2022.01)
(Continued)

(52) U.S. Cl.
CPC ...... *G06F 16/24553* (2019.01); *G06F 9/3834* (2013.01); *G06F 12/0261* (2013.01); *G06F 16/22* (2019.01); *G06F 16/24552* (2019.01); *G06F 16/24562* (2019.01); *G06F 16/284* (2019.01); *H04L 67/1097* (2013.01); *H04L 67/568* (2022.05); *H04L 67/2885* (2013.01)

(58) Field of Classification Search
CPC ............ G06F 16/24553; G06F 9/3834; G06F 12/0261; H04L 67/568; H04L 67/1097
USPC ................................ 709/217, 218, 223, 225
See application file for complete search history.

(56) References Cited

U.S. PATENT DOCUMENTS 5,920,725 A * 7/1999 Ma .......................... G06F 8/656
707/999.203
6,738,865 B1 * 5/2004 Burton ................. G06F 12/123
711/E12.071
(Continued)

*Primary Examiner* — Liang Che A Wang
(74) *Attorney, Agent, or Firm* — Sprinkle IP Law Group

(57) ABSTRACT

Systems and methods for managing concurrent access to a shared resource in a distributed computing environment are provided. A reference counter counts is incremented for every use of an object subtype in a session and decremented for every release of an object subtype in a session. A session counter is incremented upon the first instance of fetching an object type into a session cache and decremented upon having no instances of the object type in use in the session. When both the reference counter and the session counter are zero, the object type may be removed from the cache.

24 Claims, 9 Drawing Sheets

Related U.S. Application Data continuation of application No. 13/524,411, filed on Jun. 15, 2012, now Pat. No. 9,569,356.

(51) Int. Cl.
*H04L 67/568* (2022.01)
*H04L 67/2885* (2022.01)

(56) References Cited

U.S. PATENT DOCUMENTS

| | | | |
|---|---|---|---|
| 8,539,557 B1* | 9/2013 | Buckner | G06F 21/31 726/4 |
| 2004/0210909 A1* | 10/2004 | Dominguez, Jr. | H04L 67/568 709/200 |
| 2005/0226238 A1* | 10/2005 | Hoskote | H04L 69/12 370/389 |
| 2006/0026552 A1* | 2/2006 | Mazzitelli | H04L 67/02 717/101 |
| 2006/0080468 A1* | 4/2006 | Vadlamani | G06F 9/546 709/250 |
| 2008/0028085 A1* | 1/2008 | Venkatavaradan | H04L 41/0213 709/229 |
| 2008/0256299 A1* | 10/2008 | Iyengar | G06F 16/1844 711/124 |
| 2008/0288644 A1* | 11/2008 | Gilfix | H04L 69/08 709/227 |
| 2010/0088673 A1* | 4/2010 | Chen | G06F 8/4442 717/110 |

* cited by examiner

METHODS FOR UPDATING REFERENCE COUNT AND SHARED OBJECTS IN A CONCURRENT SYSTEM

RELATED APPLICATIONS

This application is a continuation of, and claims a benefit of priority under 35 U.S.C. 120 of, U.S. patent application Ser. No. 17/667,167 filed Feb. 8, 2022, entitled "METHODS FOR UPDATING REFERENCE COUNT AND SHARED OBJECTS IN A CONCURRENT SYSTEM", issued as U.S. Pat. No. 11,709,841, which is a continuation of, and claims a benefit of priority under 35 U.S.C. 120 to U.S. patent application Ser. No. 15/431,225 filed Feb. 13, 2017, entitled "METHODS FOR UPDATING REFERENCE COUNT AND SHARED OBJECTS IN A CONCURRENT SYSTEM", issued as U.S. Pat. No. 11,263,214, which is a continuation of, and claims a benefit of priority under 35 U.S.C. 120 to U.S. patent application Ser. No. 13/524,411 filed Jun. 15, 2012, entitled "METHODS FOR UPDATING REFERENCE COUNT AND SHARED OBJECTS IN A CONCURRENT SYSTEM", issued as U.S. Pat. No. 9,569,356, all of which are hereby incorporated herein for all purposes.

TECHNICAL FIELD

This disclosure relates generally to the field of database management, and more particularly, to apparatus and methods for concurrent session management.

BACKGROUND

In a distributed computing system having a content management system including a data repository, users (through client devices) establish sessions with the content management system in order to access the data repository for read and/or write operations. However, in systems where concurrent access to data resources is allowed, data errors can occur unless access by concurrent users to shared resources is controlled.

One control technique employs a reference counter which is updated every time an object type is referenced or de-referenced. However, in order to update an object or object type, the reference counter must be zero. When that happens, the object is exclusively locked so that no other reads or writes can be committed to avoid concurrency errors. However, users must wait until the object is unlocked before their session can proceed.

Therefore, it would be desirable to provide a mechanism to allow updates to objects in a more efficient manner.

DETAILED DESCRIPTION

This disclosure describes methods and systems for concurrent collection and/or generation of shared information.

In a distributed computing system, concurrent access to a shared resource is controlled by a status indicator. For example, in a single reader system, a flag is set to TRUE to indicate concurrent access by the single reader. When the flag is FALSE, then there are no concurrent sessions. In a multiple reader system, a counter is incremented each time a new concurrent session is initiated and decremented each time a session is terminated and releases the shared resource. When the counter has a value of zero, there are no concurrent sessions.

Typically, a shared resource has a defined size, for example, as a linked list. In one embodiment, after a user writes new data to the shared resource (data push), the status indicator is checked to see if there are any concurrent sessions active. If so, then older data is not removed from the shared resource (data pop) to make room for the new data until such time as there are no more concurrent sessions for that resource. If there are no active concurrent sessions, then older data is removed and the resource returns to its fixed size.

1. Operating Environment

Figure 1:
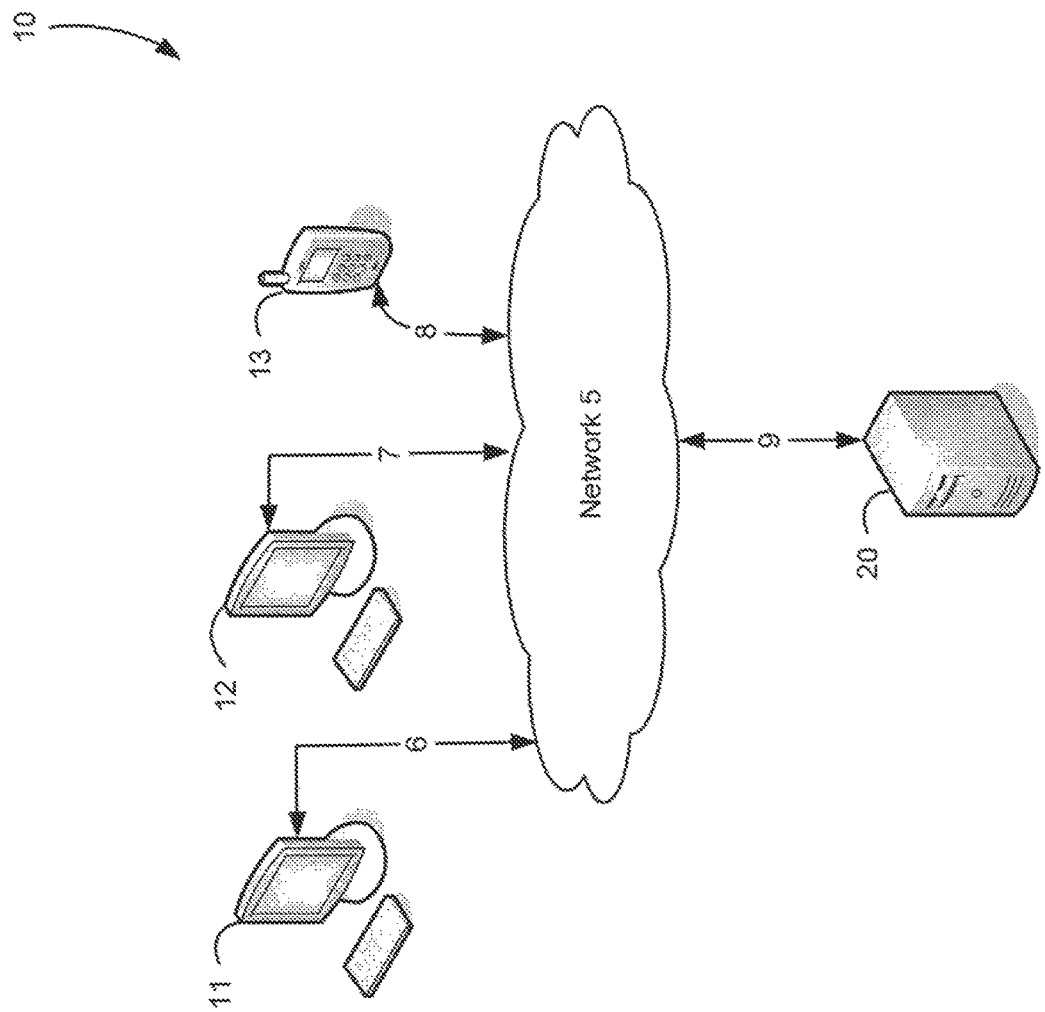
FIG. 1 is a block diagram illustrating a distributed computing system.

FIG. 1 is a simplified block diagram of a distributed computer network 10. Computer network 10 includes a number of client systems 11, 12, 13 coupled to a server system 20 via a communication network 5. Each of the client systems 11, 12, 13 and the server system 20 are coupled to the communication network 5 by communication links 6, 7, 8, 9, respectively. There may be any number of clients and servers in a system. Communication network 5 provides a mechanism for allowing the various components of distributed network 10 to communicate and exchange information with each other.

Communication network 5 may include many interconnected computer systems and communication links. Communication links 6, 7, 8, 9 may be hardwired links, optical links, satellite or other wireless communications links, wave propagation links, or any other mechanisms for communication of information, and may be the same or different for the various hardware components that are coupled to the network 5. Various communication protocols may be used to facilitate communication between the various systems shown in FIG. 1, including TCP/IP, HTTP protocols, wireless application protocol (WAP), vendor-specific protocols, customized protocols and others. In one embodiment, communication network 5 is the Internet, while in other embodiments, any suitable communication network may be used including a local area network (LAN), a wide area network (WAN), a wireless network, an intranet, a private network, a public network, a switched network, any combinations of these, and the like.

Distributed computer network 10 is merely one illustrative embodiment and is not intended to limit the scope of the disclosure. One of ordinary skill in the art would recognize many other variations, modifications and alternatives in how to effectively arrange such components and systems.

In a typical client/server arrangement as shown in FIG. 1, one or more client systems may request information from the server system, which responds to the client by providing the requested information. For this reason, a server system will typically have more computing and storage capacity than client systems, and indeed, the server system may be a gateway and content manager for providing access to content storage and related repository services as further described below. However, a particular computer system may act as either a client or a server depending on whether the computer system is requesting or providing information. Further, although aspects of the subject matter disclosed herein are described as using a client/server environment, it should be apparent that the subject matter may be embodied in other ways, for example, as a stand-alone computer system, or part of a cloud-computing environment.

Server system 20 receives requests for information from one or more of client systems 11, 12, 13 and performs processing in order to satisfy the requests, then forwards the resultant information back to the requesting client system. The processing required to satisfy the request may be performed by server system 20 or may alternatively be delegated to or obtained with the help of other servers connected to communication network 5 or to server system 20.

Client systems 11, 12, 13 enable users to access and query information stored or managed by server system 20. In one embodiment, a web browser application executing on a client system enables users to select, access, retrieve and/or query information stored or managed by server system 20. Examples of web browser programs include the Internet Explorer browser by Microsoft Corporation, the Firefox browser by Mozilla Foundation, and others.

Figure 2:
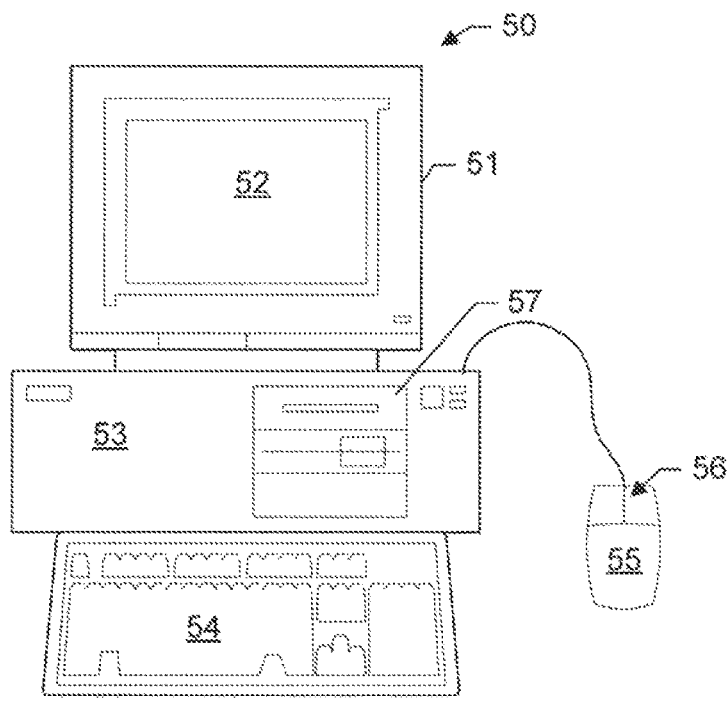
FIG. 2 is a front plan view of a computer workstation useful in the distributed computing system of FIG. 1.

FIG. 2 shows an exemplary computer workstation 50 that may serve as either a client or server system, including a monitor 51 with display screen 52, CPU cabinet 53, keyboard 54 and mouse 55 having one or more selection buttons 56. CPU cabinet 53 houses familiar computer components, such as mass storage devices 57, and other internal components which are not shown, such as a processor, memory, and the like, as further described with reference to FIG. 3 below.

Mass storage devices 57 may include disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

The subject matter described herein may be computer-implemented in a suitable system by providing computer-executable instructions stored on a non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic energy, radio frequency signals, acoustic or light waves, such as those generated during radio wave and infrared data communications.

For example, a binary machine-executable version of software instructions for providing the features described herein may be stored or reside in RAM or cache memory, or on mass storage device 57. The source code of the software may also be stored or reside on mass storage device 57 (e.g., hard disk, magnetic disk, tape or CD-ROM). As a further example, software code may be transmitted via wires or radio waves, or downloaded through a network such as the Internet.

Figure 3:
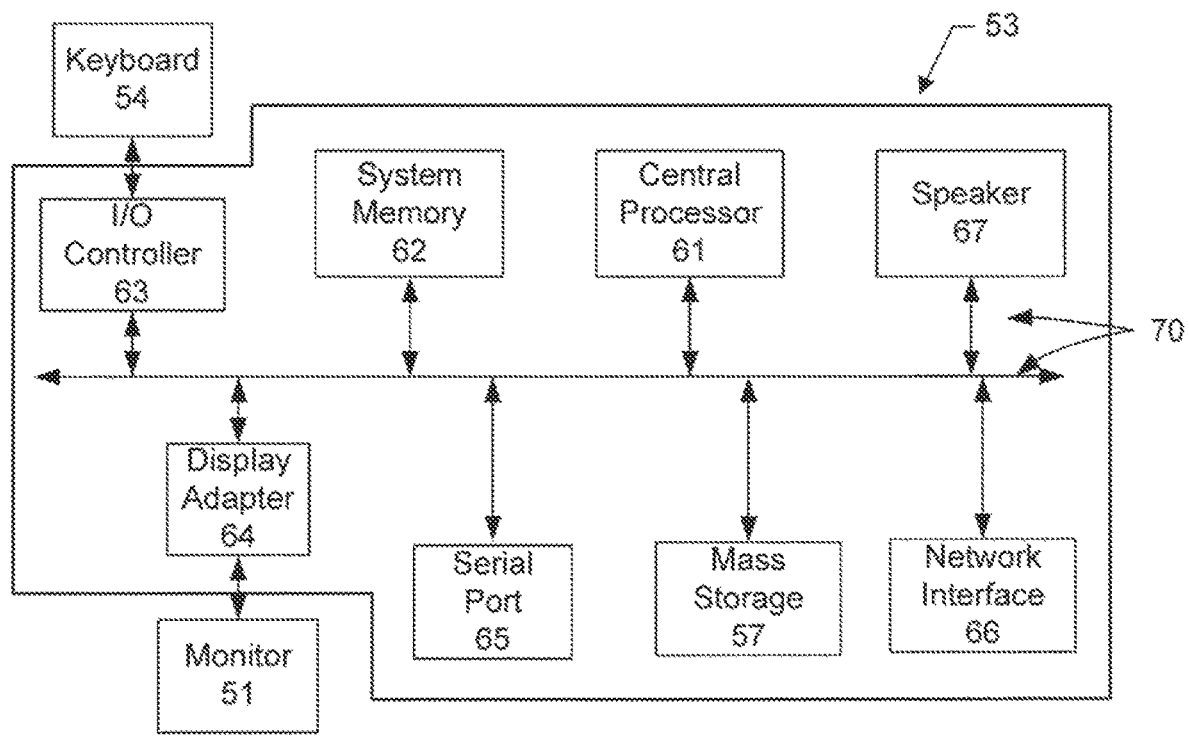
FIG. 3 is a block diagram of the components of the computer workstation of FIG. 2.

A system block diagram of the computer system/workstation 50 is shown in FIG. 3. The display monitor 51, keyboard 54 and storage devices 57 are as shown in FIG. 2. The CPU cabinet 53 contains key components such as central processor 61, system memory 62, input/output (I/O) controller 63, display adapter 64, serial or universal serial bus (USB) port 65, network interface 66, and speaker 67. In other embodiments, a computer system may include more or fewer components and/or subsystems. For one example, a computer system could include more than one processor (i.e., a multiprocessor system) or a system may include a cache memory.

The system bus 70 of computer system 50 are exemplary of an interconnection scheme serving to link the subsystems. For example, speaker 67 could be connected to the other subsystems through a port or have an internal direct connection to central processor 61. The processor 61 may include multiple processors or a multi-core processor, which may permit parallel processing of information. Computer system 50 is only one example of a suitable computer system. Other configurations of components and/or subsystems suitable for use with the methods described herein will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery. A computer software product may be an independent application with data input and data display modules. Alternatively, computer software products may be classes that are instantiated as distributed objects, or component software such as Java Beans or Enterprise Java Beans (both by Oracle Corporation). In one embodiment, the subject matter described herein is embodied as a computer program product which stores instructions, such as computer code, that when executed by a computer cause the computer to perform the processes and/or techniques described below.

The computer system 50 runs an operating system (OS) to manage hardware resources and provide common application services for application software. As an example, the computer 50 may run a Microsoft Windows® operating system (e.g., Windows NT, Windows XP, Windows Vista, Windows 7, Windows CE, Windows Mobile), or Linux, UNIX, Sun OS, Solaris, Mac OS X, Alpha OS, AIX, IRIX32, or IRIX64. Other operating systems may also be used.

2. Content Management Platform

Figure 4:
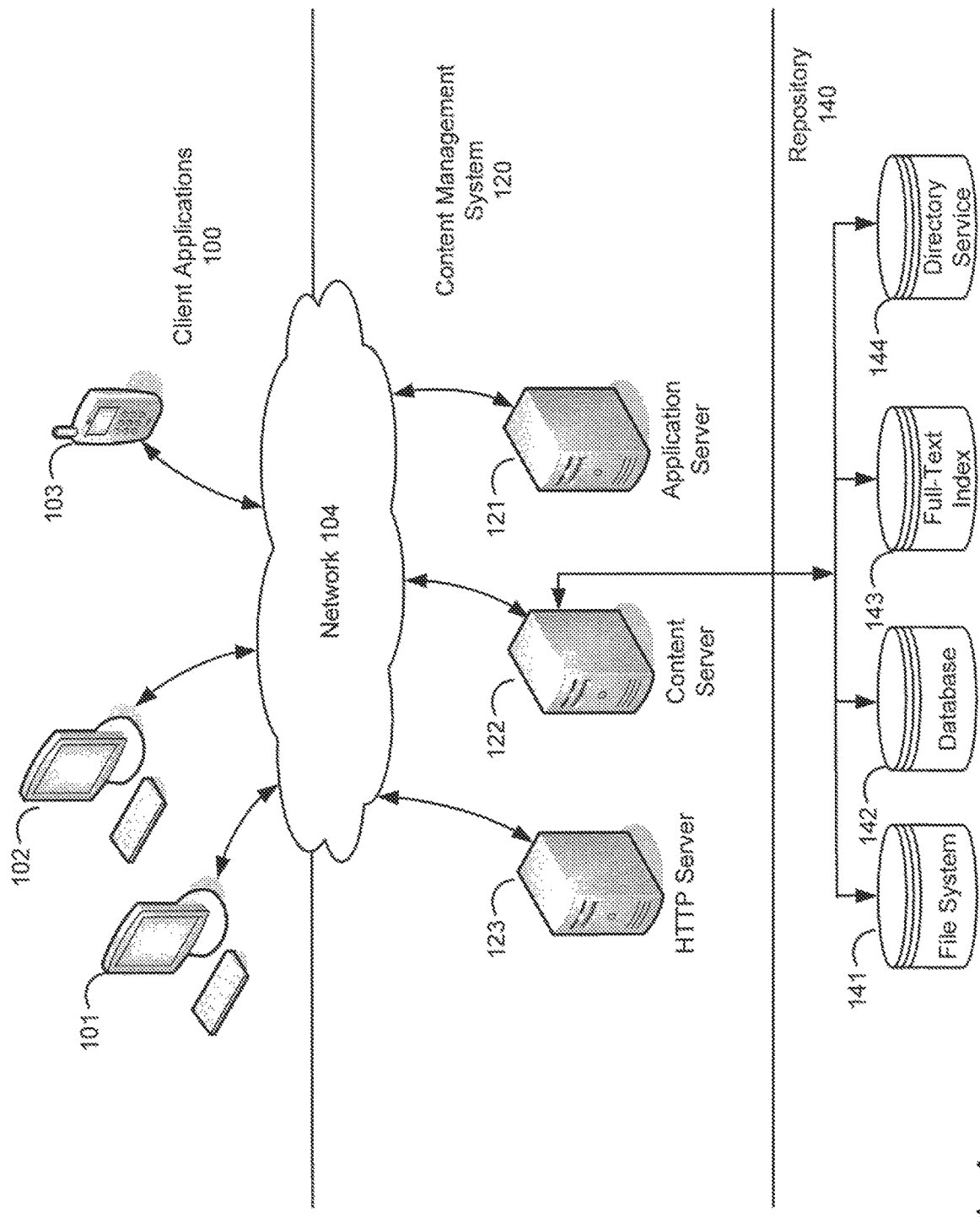
FIG. 4 is a block diagram illustrating the basic structure of an enterprise content management system.

FIG. 4 illustrates a more detailed embodiment of a distributed client/server system that provides an enterprise-level content management and repository service. A repository system 140 is operated and managed by a content management system 120, which in turn provides access to the repository for client applications 100.

The client applications 100 originate from client devices, such as devices 101, 102, 103, which communicate through a network 104 with an application server 121 in order to use one or more applications hosted on the application server. In one embodiment, the network 104 is an Ethernet connection using conventional TCP/IP communication methods with both client devices and server devices. However, other types of network connection technologies are well known and may also be used to full advantage, including local area network (LAN), wide area network (WAN), storage area network (SAN), the Internet, etc. Client devices may be any type of processor-based digital device, such as desktop or laptop computer, iPhone® or other smart hand-held device.

The application server 121 hosts one or more applications running on a content management platform that provide access to repository 140 for clients hosted on content server 122, which is also accessible to clients via network 104. An HTTP server 123 is also coupled to the network 104 to provide an administrative terminal for system operators to perform system maintenance, logging, access control, etc.

The repository 140 is provided for use by client applications 100, through the content server 122, which is accessible to the client devices through a network 104. The repository 140 may include a file store 141 for storing content items, a relational database 142 for storing attributes/metadata associated with the content items, a full-text index store 143 for the content items, and directory services 144.

A software platform runs on each of the various components, such as the EMC Documentum Platform software and related EMC Enterprise Content Management software, distributed by EMC Corporation, Hopkinton, Mass. The Documentum Platform provides capabilities for managing enterprise content and is the foundation for related content management and case management product offerings.

Figure 5:
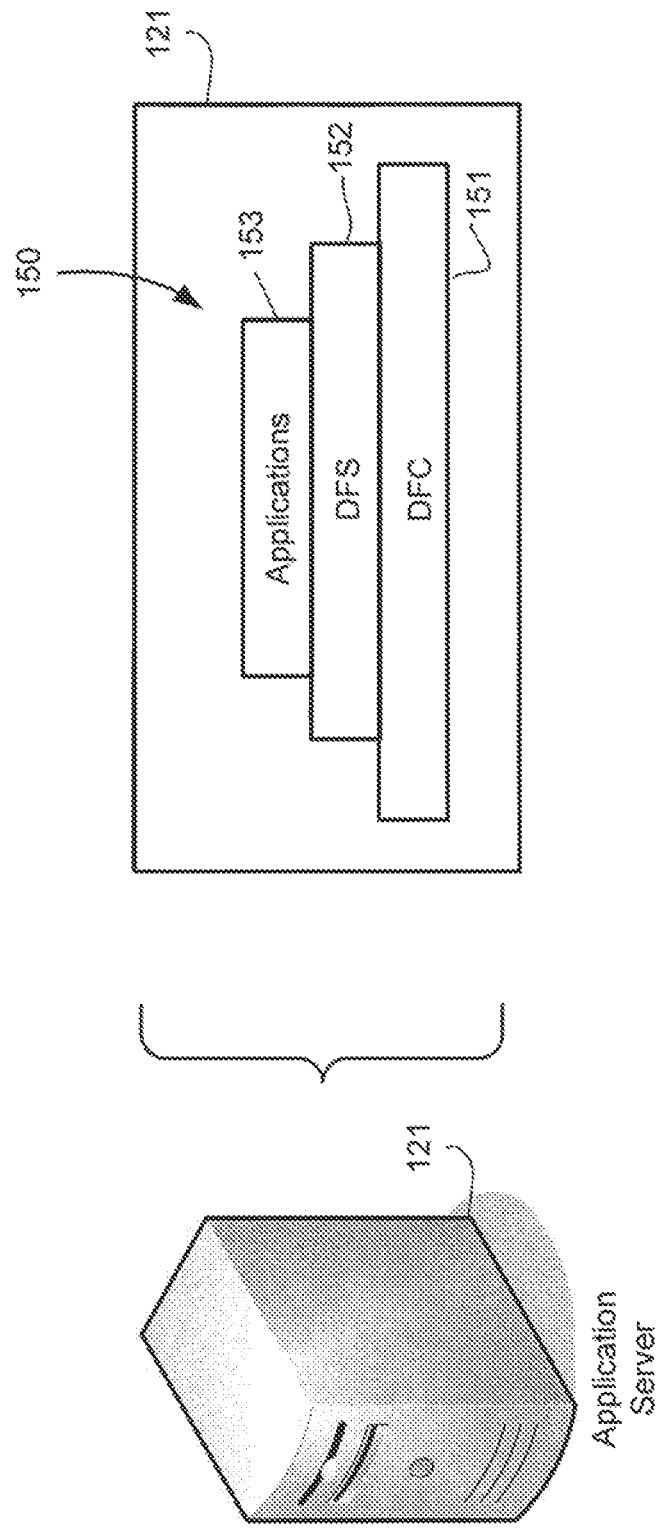
FIG. 5 is a block diagram illustrating the software framework implemented in a component of FIG. 1.

For example, FIG. 5 shows one simplified embodiment of the application server 121, which runs a content management framework 150 having a foundation layer 151, such as Documentum Foundation Classes (DFC), an interface layer 152, such as Documentum Foundation Services (DFS), and one or more applications on application layer 153 having integrated Documentum functionality through a Web Development Kit (WDK) or Webtop, for example. The HTTP server 123 runs a similar content management framework, for applications such as System Administrator or Intranet Client.

DFC is the programming interface for accessing the functionality of the Documentum platform through Java and COM class libraries and underlies all Documentum platforms. DFS is an SOA development framework and application programming interface (API), based on web services, and designed to support interoperable machine-to-machine interaction over a network. DFS is now the primary interface for most developers and users of the Documentum platform, although the terms DFC and DFS are frequently (although incorrectly) used interchangeably.

Each of the client's 101, 102, 103 also runs a content management framework, with the API provided by the Documentum Client Library (DMCL), which is a linked library inside the client application (a DLL in Windows; a shared library in Unix). The DMCL takes documented API calls made by the client application and maps them to Server RPC functions that can be executed by the Content Server. Once the API call has arrived inside the Content Server, processing is no longer affected by the DMCL environment. In fact, the DMCL thread that made the call will simply be sleeping awaiting the results of the processing from the server.

The Documentum platform also includes an extensible Business Objects Framework (BOF) which is built into DFC. BOF provides a useful framework and methodology for developing reusable business logic components called Business Objects that can be plugged into middle tier or client applications. More information about the Documentum Platform and related content management and case management product offerings can be found on the EMC website located at URL www.emc.com.

3. Session Management

A session is established between a client and the data repository when the client software issues an API call to connect to the content server. The DMCL on the client device creates a thread (Windows) or a process (Unix) representing the session in client memory, and likewise, the content server creates a thread/process representing the session on the server. A session created on the client device typically does not have a timeout associated with it, but will remain in client memory until disconnected. A session on the server, however, will usually have a timeout set in the configuration file.

Although concurrent sessions are generally permitted in most systems, there are typically limits set in configuration files for the number of sessions that may be handled at one time, and these limits are usually different for the client (fewer sessions) and the server (more sessions). In the client, the DMCL layer defines a key [max_session_count] in the configuration file [dmcl.ini] that controls the number of sessions which may be active on the client at one time. The server also includes a defined key [concurrent_sessions] in its configuration file [server.ini] that controls the number of sessions that may be active on the server.

4. Object Types and Type Cache

Many databases and content management systems, such as the EMC Documentum platform, are object-oriented systems wherein each individual item is defined as an object. An object type represents a class of objects, and the definition of an object type is a set of properties whose values describe individual objects of that type. Thus, object types are like templates, and the content server uses the type definition as a template to create an object and then set the properties of the object to values specific to that object instance.

While objects are actually stored in the data repository, the content server allocates server resources, including pointers and caches, to facilitate session management of objects. For example, an Object Cache may be defined to deal with objects based on a set of policies, including fetching, finding, naming, mapping, detaching, and cloning objects. A Global Cache may be defined as the object cache of the root session, and is used as the basis for spawning new user sessions. A pointer may be defined to point to a specified object in the global cache. A Session Cache may be defined as the object cache for the session. When a new session is created, the session cache is populated by the global cache. One or more Change Checker routines may be defined to periodically wake up and refresh the global cache and other caches as required to ensure that entries are up to date.

However, considerable overhead may be consumed with cache operations. For example, a subtype usually repeats the definition of its inherited attributes from its parent type. Another example from the Windows platform is that type definitions are copied from the main thread to the session thread even though they are identical. Also, in Unix platforms, object types are constantly updated which causes the session to create its own copy, known as the "copy-on-write" (COW) mechanism.

Figure 6A:
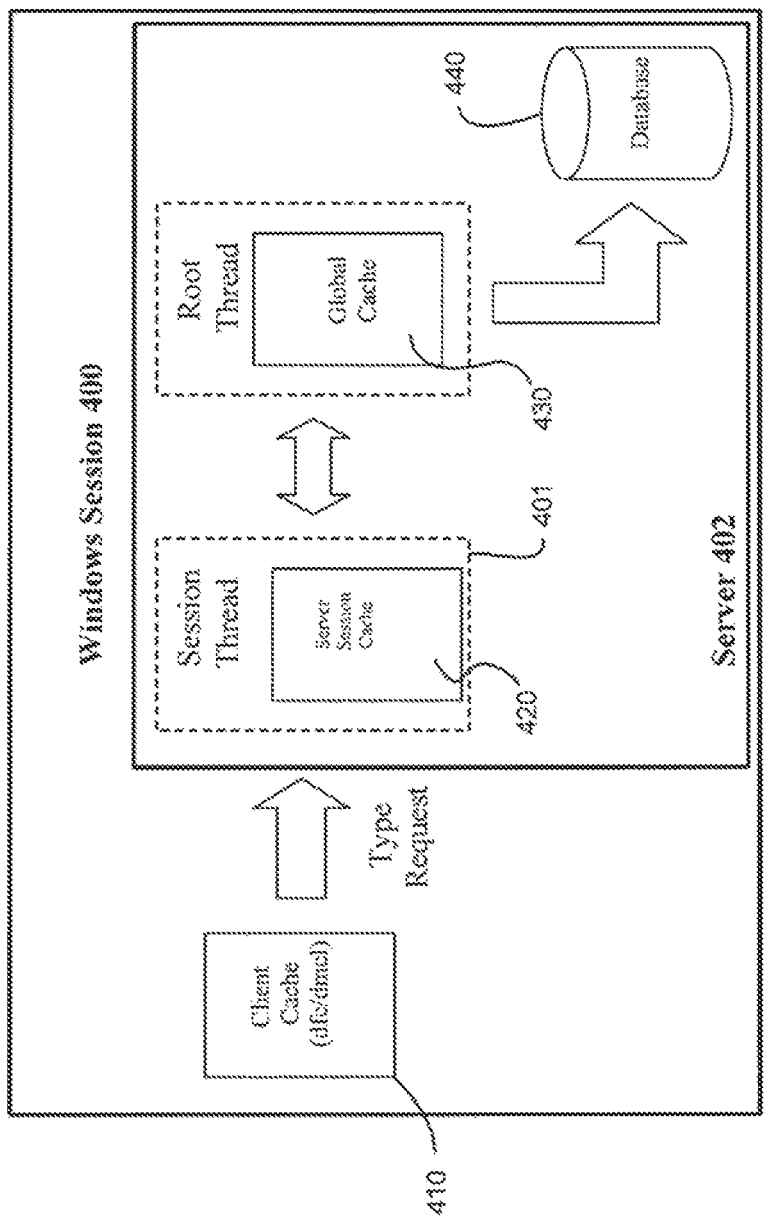
FIG. 6A is a block diagram illustrating a conventional Windows session thread.
Figure 6B:
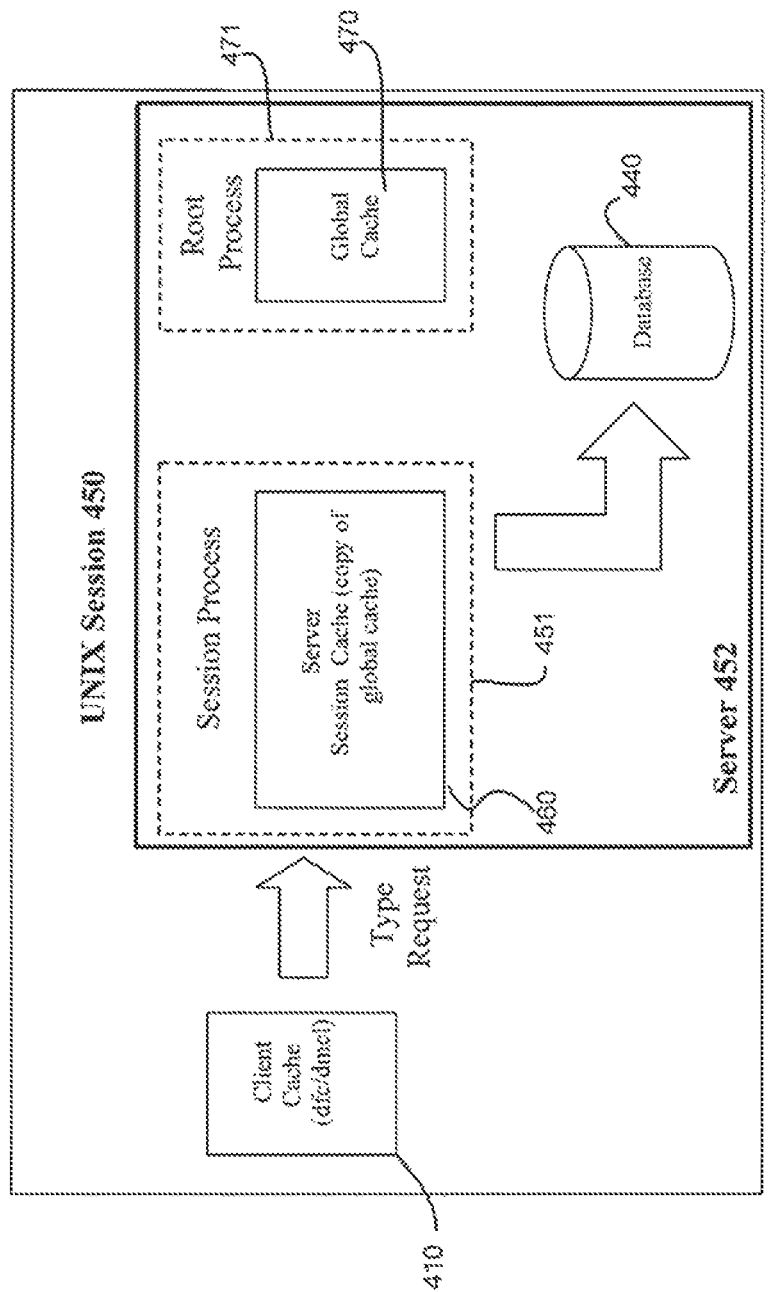
FIG. 6B is a block diagram illustrating a conventional Unix session process.

Current implementations of the Type Cache are different on thread-based Windows platforms (see FIG. 6A) and process-based Unix platforms (see FIG. 6B).

FIG. 6A shows a Windows session 400 having a session thread 401 established on server 402. In a thread-based environment, there is a global heap which every thread can access. The cache in the global heap (global cache 430) serves as the base where every new session inherits the type objects from the global cache to the session cache 420. When a client asks for a type object from the session server 402, the cache 410 in the client device first checks the session cache 420. If the session cache 420 has the type object, it returns it to the client cache 410. If not, the session cache then looks to the global cache 430. If the global cache 430 does not have the type object, it fetches it from database 440.

If there is a parent/child cache set up in a Windows thread, the global (parent) cache actually issues a call back into the session (child) cache and forces it to load the type object, and then create a copy allocated from the global heap to store in its own object store. This is done to avoid lengthy locking times on the global cache which can block other sessions from accessing the cache.

FIG. 6B shows a corresponding Unix process 450. In a Unix process, the session inherits its type cache from the global cache based on the copy-on-write mechanism. When a client asks for a type object, the session will first look into its own cache 460. If the type object is not found there, it will go directly to the database 440 instead of going to the global cache 470. This is because the session process 451 cannot access the global cache 470 residing in the private memory of the root process 471. If the type is found in the database 440, the server 452 will post a notification in the change record so that the type object gets loaded into the global cache 470 the next time the change checker routine runs.

As is evident from FIGS. 6A and 6B, it is not trivial to maintain consistency among the global cache, session cache and database when type objects are changed.

Figure 6C:
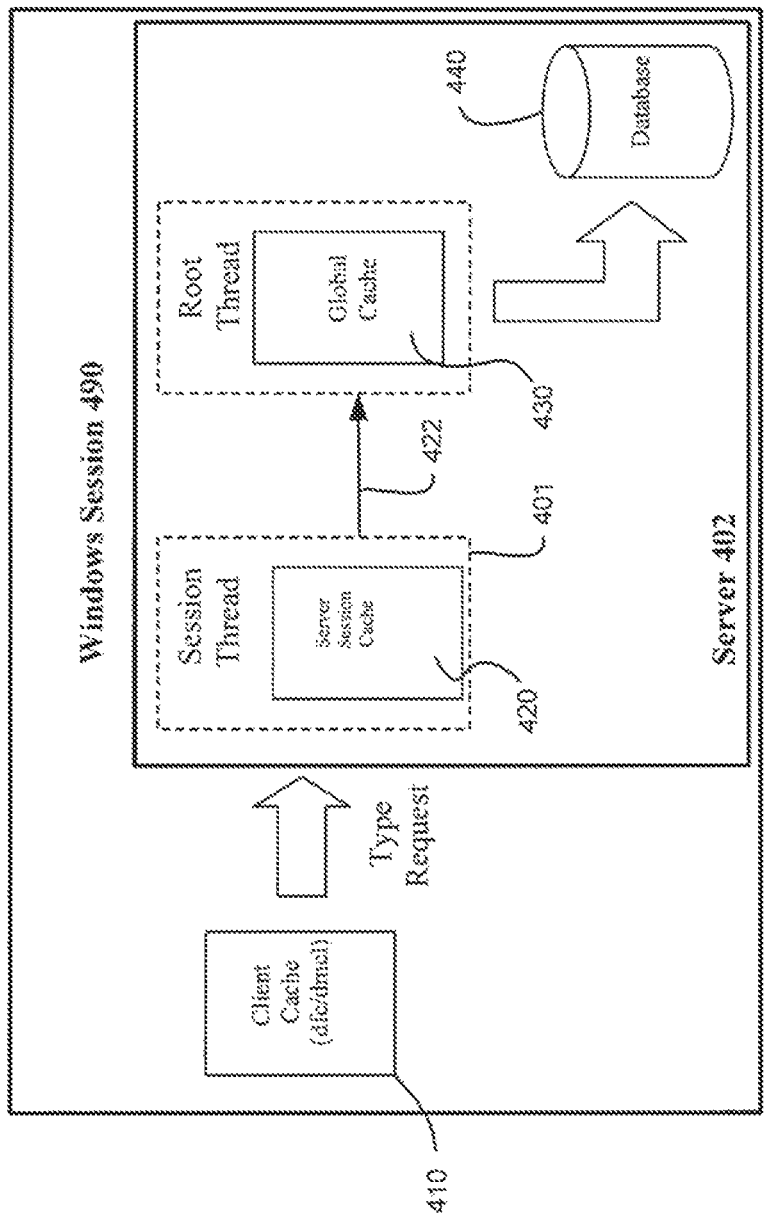
FIG. 6C is a block diagram illustrating an embodiment of an improved session configuration.

In the new implementation shown in FIG. 6C, the session cache 420 issues an RPC to generate one or more pointers 422 to point directly to the corresponding type objects in global cache 430 when the session places those type objects in use. After each RPC, the pointers 422 in session cache 420 will be set back to NULL (or destroyed if only a session copy) if there is no open transaction involving those type objects.

5. Object Reference Count

In current implementations of the type class, the variable reference count [ref count] is used to keep track of how many times the type object is referenced, including the following:

(i) sub-type reference count—the number of sub-types pointing to the type object;
(ii) cache reference count—anytime a type object is added to the cache or removed from the cache, the reference count is increased by one or decreased by one, respectively; and
(iii) object reference count—the number of persistent objects of the type pointing to the type object.

In particular, the cache reference count and the object reference count cause the type object to be updated frequently, and such operations unnecessarily consume memory creating a possible negative impact on performance. For example, the reference count may trigger the copy-on-write mechanism on the Unix platform.

In an effort to reduce the memory overhead requirements for type objects and type cache in sessions, in one embodiment, the existing variable reference count is changed from an intersession counter to an intra-session counter by referring only to subtypes. During type creation, the variable [subtype_ref_count] will be incremented as needed.

Thus, the reference count will not be increased when a type object is inserted into session cache or global cache, but only when a subtype is used. Likewise, there is no need to decrease the reference count when a type object is detached, but only when a subtype is detached. However, a type object will still be marked as invalid when it is detached from the cache.

Figure 7:
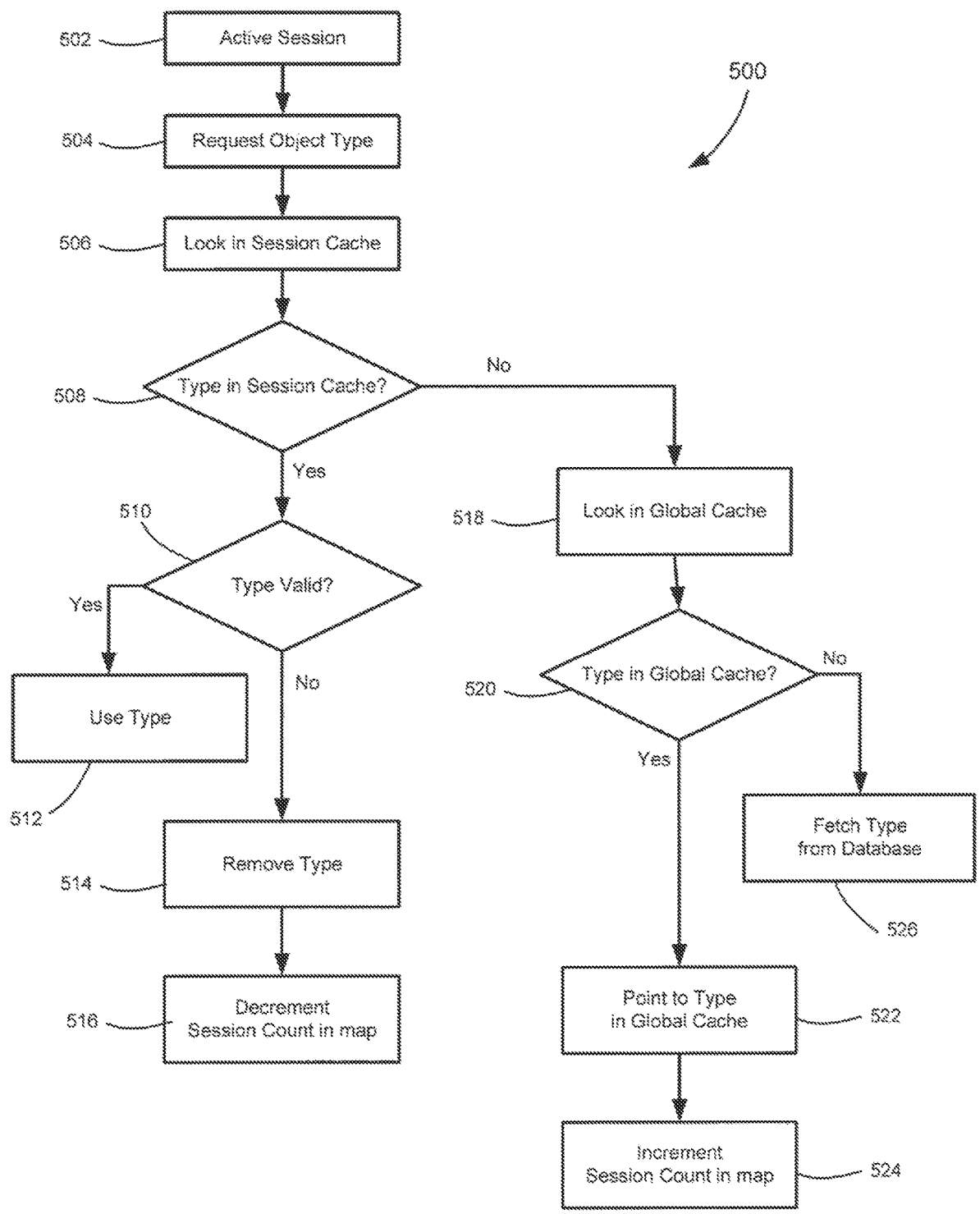
FIG. 7 is a flow chart illustrating a process for counting intersession and intrasession references to objects.

In one thread embodiment for a Windows environment shown in FIG. 7, a method 500 employs two reference counts: a session reference count and a subtype reference count. The new counter, session reference count, will be used to map a type pointer in the global cache to the session reference count. As noted above, the old counter is re-characterized as the subtype reference count.

In step 502, a session is active. In step 504, a type object is requested by the session. In step 506, the session looks for the type object in its session cache. Step 508 poses the question "is the type object in the session cache?" If so, then proceed to step 510, which poses the question "is the type object in the session cache valid?" If so, then in step 512, the session uses the type object in the session cache. If the type object is not valid in step 510, then the type object is removed from the session cache in step 514, and the session reference count in the global context map is decremented in step 516.

If the type object is not in the session cache in step 508, then in step 518, the session looks it up in the global cache. If the type object is in the global cache (step 520), then a pointer is placed in the session cache that points directly to the corresponding type object in the global cache in step 522. Further, the session reference count in the global context map is increased by one in step 524. If the type object is not found in the global cache in step 520, then the global cache fetches the type object from the database in step 526, then proceeds to step 522.

At the end of each session RPC, all entries in the session cache will be removed (except for local copies). Further, the session reference count for each type object in the global context map will be decreased by one if there are no open transactions.

If the subtype reference count and the session reference count are both equal to 0 and the type object is marked as invalid, then it will be removed from the global cache and destroyed. When a type object is destroyed, the reference count to its supertype subtype will be decreased by one.

6. Updating Object Types

Under some conditions, the object type may need to be updated in the global cache. However, since the global cache is shared among threads/processes, any concurrency must be managed in order to avoid read or write errors. A prior solution was to simply lock the object in the global cache, then make and save changes to the object, and then unlock the changed object. Of course, no one has access to the object when it is locked except the user making the changes, and this can cause unacceptable delays.

Figure 8:
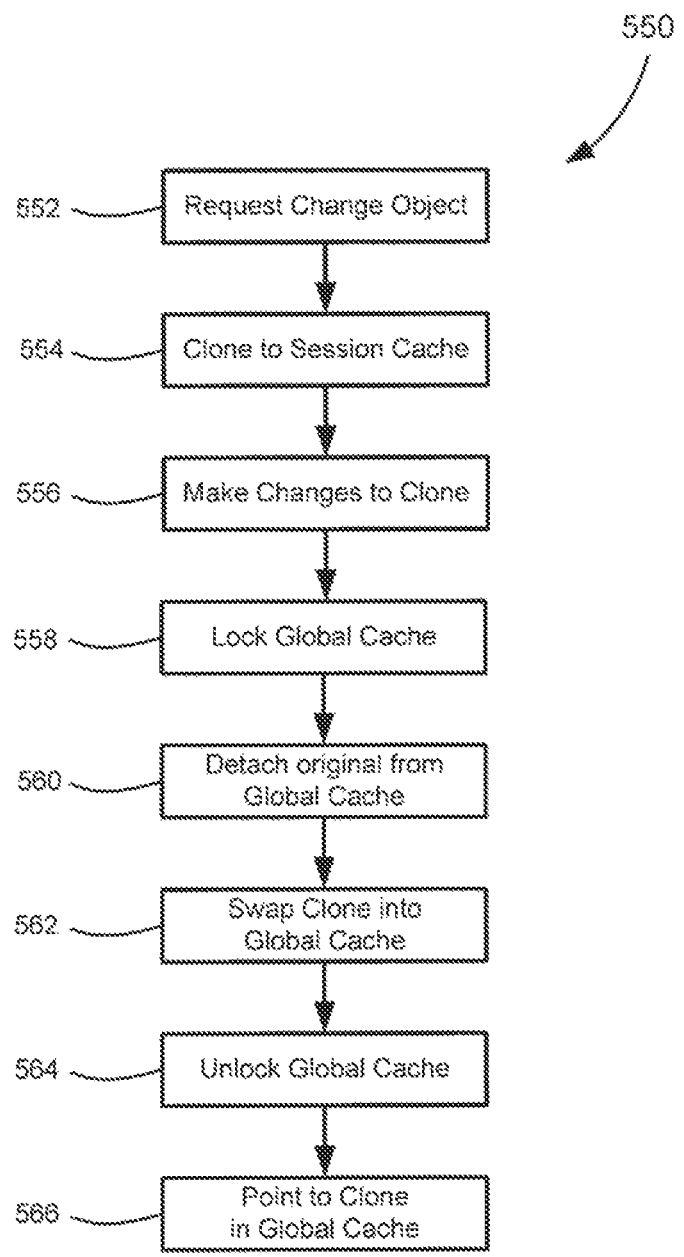
FIG. 8 is a flow chart illustrating a process for updating objects.

For example, changes to the type definition may be triggered by an SQL statement. Referring to FIG. 8, a process 550 is illustrated that improves the efficiency of updates. In step 552, a request to change an object type is received. In step 554, the object type is cloned from the global cache to the session cache. In step 556, changes are made to the cloned copy of the object type. In step 558, the global cache is locked. In step 560, the original object type is detached from the global cache. In step 562, the cloned copy with changes is saved into the global cache and is now the object type. In step 564, the global cache is unlocked. In step 566, a pointer in the session cache is updated to point to the referenced object type.

What is claimed is:

1. A non-transitory, computer-readable storage medium encoded with computer-executable instructions, the computer-executable instructions comprising instructions for:
   establishing a first session between a first client and a content server over a network;
   populating a first session cache at the content server from a global cache;
   providing a session counter to track references to an object type across a plurality of session caches for a plurality of concurrent sessions over the network;
   providing a reference counter that is incremented upon every instance of using a subtype of the object type in the first session and is decremented upon every instance of releasing the subtype of the object type from the first session; and
   removing the object type from the global cache based on a determination that the session counter and the reference counter are both zero.

2. The non-transitory, computer-readable storage medium of claim 1, wherein the computer-executable instructions further comprise instructions for:
   searching for the object type in the first session cache; and
   based on a determination that the object type is in the first session cache and the object type is marked as invalid, removing the object type from the first session cache and decrementing the session counter.

3. The non-transitory, computer-readable storage medium of claim 2, wherein the computer-executable instructions further comprise instructions for:
   based on a determination that the object type is not in the first session cache, searching for the object type in the global cache; and
   based on a determination that the object type is in the global cache, adding a pointer to the first session cache and incrementing the session counter, the pointer pointing to the object type in the global cache.

4. The non-transitory, computer-readable storage medium of claim 3, wherein adding the pointer to the first session cache comprises the first session cache issuing an RPC to generate the pointer.

5. The non-transitory, computer-readable storage medium of claim 3, wherein the computer-executable instructions further comprise instructions for:
   based on a determination that the object type is not found in the global cache, fetching the object type into the global cache.

6. The non-transitory, computer-readable storage medium of claim 1, wherein the computer-executable instructions further comprise instructions for:
   searching for the object type in the first session cache;
   based on a determination that the object type is not in the first session cache, searching for the object type in the global cache; and
   based on a determination that the object type is in the global cache, adding a pointer to the first session cache and incrementing the session counter, the pointer pointing to the object type in the global cache.

7. The non-transitory, computer-readable storage medium of claim 1, wherein the computer-executable instructions further comprise instructions for:
   at an end of the first session, clearing the object type from the first session cache and decrementing the session counter.

8. The non-transitory, computer-readable storage medium of claim 1, wherein the computer-executable instructions further comprise instructions for:
   receiving a request to change the object type;
   based on the request to change the object type, cloning the object type from the global cache to the first session cache to create a cloned copy in the first session cache;
   receiving changes to the cloned copy;
   locking the global cache;
   detaching the object type from the global cache;
   saving the cloned copy with the changes into the global cache as the object type; and
   unlocking the global cache.

9. The non-transitory, computer-readable storage medium of claim 8, wherein the computer-executable instructions further comprise instructions for:
   adding, to the first session cache, a pointer to the object type in the global cache; and
   after storing the cloned copy with the changes into the global cache, updating the pointer to point to the cloned copy in the global cache.

10. The non-transitory, computer-readable storage medium of claim 1, wherein the computer-executable instructions further comprise instructions for creating a plurality of session threads, wherein the global cache is shared among the plurality of session threads.

11. The non-transitory, computer-readable storage medium of claim 1, wherein the computer-executable instructions further comprise instructions for creating a plurality of session processes, wherein the global cache is shared among the plurality of session processes.

12. A computer-implemented method for cache management, the computer-implemented method comprising:
    establishing a first session between a first client and a content server over a network;
    populating a first session cache at the content server from a global cache;
    providing a session counter to track references to an object type across a plurality of session caches for a plurality of concurrent sessions over the network;
    providing a reference counter that is incremented upon every instance of using a subtype of the object type in the first session and is decremented upon every instance of releasing the subtype of the object type from the first session; and
    removing the object type from the global cache based on a determination that the session counter and the reference counter are both zero.

13. The computer-implemented method of claim 12, further comprising:
    searching for the object type in the first session cache; and
    based on a determination that the object type is in the first session cache and the object type is marked as invalid, removing the object type from the first session cache and decrementing the session counter.

14. The computer-implemented method of claim 12, further comprising:
    searching for the object type in the first session cache;
    based on a determination that the object type is not in the first session cache, searching for the object type in the global cache; and
    based on a determination that the object type is in the global cache, adding a pointer to the first session cache and incrementing the session counter, the pointer pointing to the object type in the global cache.

15. The computer-implemented method of claim 12, further comprising:
searching for the object type in the first session cache;
based on a determination that the object type is not in the first session cache, searching for the object type in the global cache; and
based on a determination that the object type is not found in the global cache, fetching the object type into the global cache.

16. The computer-implemented method of claim 12, further comprising:
adding, to the first session cache, a pointer to the object type in the global cache;
receiving a request to change the object type;
based on the request to change the object type, cloning the object type from the global cache to the first session cache to create a cloned copy in the first session cache;
receiving changes to the cloned copy;
locking the global cache;
detaching the object type from the global cache;
saving the cloned copy with the changes into the global cache as the object type; and
after storing the cloned copy with the changes into the global cache:
updating the pointer to point to the cloned copy in the global cache; and
unlocking the global cache.

17. The computer-implemented method of claim 12, further comprising creating a plurality of session threads wherein the global cache is shared among the plurality of session threads.

18. The computer-implemented method of claim 12, further comprising creating a plurality of session processes, wherein the global cache is shared among the plurality of session processes.

19. The computer-implemented method of claim 12, further comprising clearing the object type from the first session cache and decrementing the session counter at an end of the first session.

20. A system for providing controlled access to a shared resource in a distributed computing environment, comprising:
a repository; and
a session server that provides access to the repository for client applications, the session server comprising a memory and a processor, the memory including session server code, the session server code comprising instructions executable by the processor for:
maintaining a global cache;
establishing a plurality of concurrent sessions with clients over a network;
providing a plurality of session caches, the plurality of session caches comprising a session cache for each of the plurality of concurrent sessions;
populating the plurality of session caches from the global cache;
providing a session counter to track references to an object type across the plurality of session caches;
providing, for a first session cache from the plurality of session caches, a reference counter that is incremented upon every instance of using a subtype of the object type in a first session from the plurality of concurrent sessions and is decremented upon every instance of releasing the subtype of the object type from the first session; and
removing the object type from the global cache based on a determination that the session counter and the reference counter are both zero.

21. The system of claim 20, wherein the session server code further comprises instructions for:
searching for the object type in the first session cache;
based on a determination that the object type is not in the first session cache, searching for the object type in the global cache; and
based on a determination that the object type is in the global cache, adding a pointer to the first session cache and incrementing the session counter, the pointer pointing to the object type in the global cache; and
based on a determination that the object type is not found in the global cache, fetching the object type from the repository into the global cache.

22. The system of claim 21, wherein adding the pointer to the first session cache comprises the first session cache issuing an RPC to generate the pointer.

23. The system of claim 21, wherein the session server code further comprises instructions for removing the object type from the first session cache and decrementing the session counter based on a determination the object type is in the first session cache and the object type is marked as invalid.

24. The system of claim 20, wherein the session server code further comprises instructions for:
adding, to the first session cache, a pointer to the object type in the global cache;
receiving a request to change the object type;
based on the request to change the object type, cloning the object type from the global cache to the first session cache to create a cloned copy in the first session cache;
receiving changes to the cloned copy;
locking the global cache;
detaching the object type from the global cache;
saving the cloned copy with the changes into the global cache as the object type; and
after storing the cloned copy with the changes into the global cache:
updating the pointer to point to the cloned copy in the global cache; and
unlocking the global cache.

* * * * *